United States Patent [19]
Bernardo

[11] Patent Number: 6,113,176
[45] Date of Patent: Sep. 5, 2000

[54] SLAT HOUSE HINGE FOR LAMINATED RETRACTABLE TRUCK BED COVER

[75] Inventor: Richard Gregory Bernardo, Pompano Beach, Fla.

[73] Assignee: Roll-N-Lock Corporation, Pompano Beach, Fla.

[21] Appl. No.: 09/165,710

[22] Filed: Oct. 2, 1998

[51] Int. Cl.⁷ .............. B60J 7/02; B60J 11/00; E06B 25/12
[52] U.S. Cl. .............. 296/100.01; 296/100.09; 296/98; 160/235
[58] Field of Search .......... 296/100.01, 100.09, 296/100.11, 100.12, 98; 160/235

[56] References Cited

U.S. PATENT DOCUMENTS

| | | | |
|---|---|---|---|
| 4,784,427 | 11/1988 | Burgess | 296/98 |
| 4,807,921 | 2/1989 | Champie, III et al. | 296/98 |
| 4,889,381 | 12/1989 | Tamblyn et al. | 296/98 |
| 5,040,843 | 8/1991 | Russell et al. | 296/98 |

FOREIGN PATENT DOCUMENTS 482417  4/1952  Canada ................... 160/235

Primary Examiner—Joseph D. Pape
Assistant Examiner—Greg Blankenship
Attorney, Agent, or Firm—Malin, Haley & DiMaggio, P.A.

[57] ABSTRACT

An improved slat hinge for a laminated retractable truck bed cover that permits greater relative movement between adjacent slats for slat rotation up to 45 degrees to significantly reduce roll diameter while preventing stretching or stress on a pliable surface material that forms the laminate on top of the slats. The hinge itself is formed by strategically designed leading and trailing edges of each slat which engage in an adjacent fashion to permit the desired movement while in the full open position eliminating the possibility of slat disengagement while reducing roll diameter in the stored position resulting in a smooth frictionless hinge rotation with a positive stop.

3 Claims, 5 Drawing Sheets

SLAT HOUSE HINGE FOR LAMINATED RETRACTABLE TRUCK BED COVER

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

This invention relates generally to laminated truck bed covers that can be rolled up in a storage position, and specifically to a laminated retractable truck bed cover having an improved slat hinge that reduces the transfer of stress to the pliable laminate surface material, locks adjacent slats in a flat disposition to eliminate slat disengagement, reduces roll diameter and provides a smooth frictionless hinged rotation.

2. Description of Related Art

Retractable truck bed covers are utilized with open bed pickup trucks to provide security and protection for articles mounted in the truck bed. One type of retractable truck bed cover currently in use is comprised of a pliable surface material laminated on top of a slat array. The slat array includes a plurality of rigid slats joined together along their edges which allows the entire slat array to be moveably mounted in a pair of side rails so that the cover can be moved from a first flat position covering the truck bed to a second stored position where the cover is retracted (rolled up) on a reel or spindle in a housing.

The conventional slat array includes slats having front and rear edges that join adjacent slats together. The conventional front slat edge has an upwardly facing 90° flange and a rear edge having a downwardly facing 90° flange on the adjacent slat forming a hinge with the pliable surface material. Because the overlapping flanges are at right angles to one another, the geometry of the current hinge is such that side by side slat rotation during the rolling process is limited to approximately 38 degrees, thus limiting the roll diameter. Also, the construction of the existing hinge is such that no stops are provided and therefore the adjacent pivotal angular slat movements stretch the pliable material each time the cover is rolled up in a retractable position. When the cover is in the rolled up position, the slat hinges of the existing slat design are unsupported and stress is transferred to the pliable (vinyl) surface material which eventually creates a stress line along each hinge line. The cover becomes aesthetically visually unattractive with the stress lines.

Another drawback of the current existing hinge design is if enough force (lateral or flat disposition) is placed on the adjacent slat hinge joints for whatever reason, adjacent slats may separate and disengage, which is an undesirable feature.

The present invention overcomes these problems by providing an improved retractable truck bed cover with a laminate vinyl or pliable surface material that decreases the roll diameter of the retracted cover in the storage position, prevents stress on the vinyl material and provides for positive slat locking action that prevents adjacent slats from becoming disengaged.

BRIEF SUMMARY OF THE INVENTION

This invention comprises a retractable truck bed cover having improved slat hinge joints comprising a plurality of elongated rigid slats forming a structural base or substrate having a pliable surface material such as vinyl laminated to the top side of the slatted substrate by structural adhesive, such as a high bond two sided tape with leading and trailing slat edges that form slat hinges that eliminate unsightly stress lines in the vinyl material and increases the roll angle of the top.

Each of the elongated slats, bonded to the pliable surface material, are hinged together in a side by side relationship forming a slatted array that can be manually disposed in a first flat position (slats in same flat plane i.e. 180° relative to each other) where the array is moveably attached in rails or channels to a truck bed forming the truck bed cover and in a second position (for storage) where the cover can be rolled up about a reel in a storage box located at the end of the truck bed.

Each slat may be approximately two to three inches wide and a quarter to half inch thick and made of extruded aluminum. Each slat includes a leading edge and a trailing edge. The purpose of the leading edge and the trailing edge is to form an interlocking hinge joint between adjacent slats when mounted side by side so that the leading edge of one slat engages the trailing edge of the adjacent slat in conjunction with the bonded pliable material forming a plurality of hinge joints which allow the cover to be rolled up around a reel or spindle.

The geometrical shape of the leading edge differs from the shape of the trailing edge. Both edges are strategically designed to cooperate together to form a stress free hinge to prevent any stretching forces on the pliable vinyl surface material in the rolled position. Specifically, the leading edge of each slat has a downwardly protruded, arcuate flange having predetermined inner and outer radii which curve beyond a 90 degree position terminating in a flat end portion on the concave side. Conversely, the trailing edge of each slat has an upwardly protruding curved flange of predetermined inner and outer radii and a substantially flat end flange portion that projects at a 45° angle relative to the slat body. The outer radius of curvature of the outer surface of the leading edge slat surface is sized to snugly engage the inner surface of the trailing edge of the slat in a first position (adjacent slats at a 45° angle relative to each other) wherein the flat end of the trailing edge flange engages the bottom surface of an adjacent slat forming a stop to prevent further rotation between the adjacent slat. In the stop position, there is approximately a 45 degree angle permitted between adjacent slats which represents the rolled up position. In the fully extended position, there is no stress on the pliable surface material because of the structural geometry of the leading and trailing edge hinge members.

In the second slat array disposition or position, whenever adjacent slats are in the same plane at a 180 degree angle, the trailing edge hinge portion is locked together with the slat leading edge hinge portion to prevent separation of adjacent slats. This is especially important for the closed position of the truck bed cover (flat) to prevent slat separation due to forces that may be imposed on the truck bed cover. In the hinge joint, the pliable material has an area that is not bonded to either adjacent slat sized to permit locking of adjacent slats without stretching the material, even though the distance between the leading edge hinge flange and the adjacent trailing edge flange changes from the flat position to the angular position.

To construct the present invention, a plurality of aluminum slats with the leading and trailing edge configurations discussed herein are joined side by side and a vinyl or other pliable surface material is laminated to the slatted substrate or slat array using a structural adhesive, such as a high bond two-sided tape so that the pliable surface material is permanently affixed to the top side of the slat array. The laminated cover must appear flat and not wrinkled, in the flat position when the truck bed cover is extended over the truck bed, and the cover must also be able to be rolled up around a reel or spindle into a relatively compact unit in the storage position. Using the present invention, the improved slat hinge between the leading and trailing edges of adjacent slats results in a smooth, frictionless rotation of the slats in the rolled up position while being locked together firmly in a full open position, eliminating the possibility of slat disengagement. The present hinge design also greatly reduces the roll diameter by increasing slat rotation at least eighteen percent (18%) between adjacent slats up to 45°.

It is an object of this invention to provide an improved retractable truck bed cover having a vinyl or other pliable surface that is laminated to a plurality of rigid hinge slats to reduce the stress on the pliable material to prevent stretching and wear.

It is another object of this invention to provide an improved hinge joint for a slatted retractable truck bed cover having a pliable surface that insures adjacent slats are locked together preventing disengagement while also reducing the roll diameter of the entire truck bed cover for the storage position without putting stress on the resilient material.

And yet still another object of this invention is to provide an improved retractable truck bed cover having a pliable or vinyl like surface laminated to a plurality of rigid slats that include a hinged portion that has a positive stop at the appropriate angle between the slats to prevent stress on the resilient cover.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 6 shows a side elevational view of a slat used in the invention with appropriate representative dimensions.

DETAILED DESCRIPTION OF THE INVENTION

Figure 1:
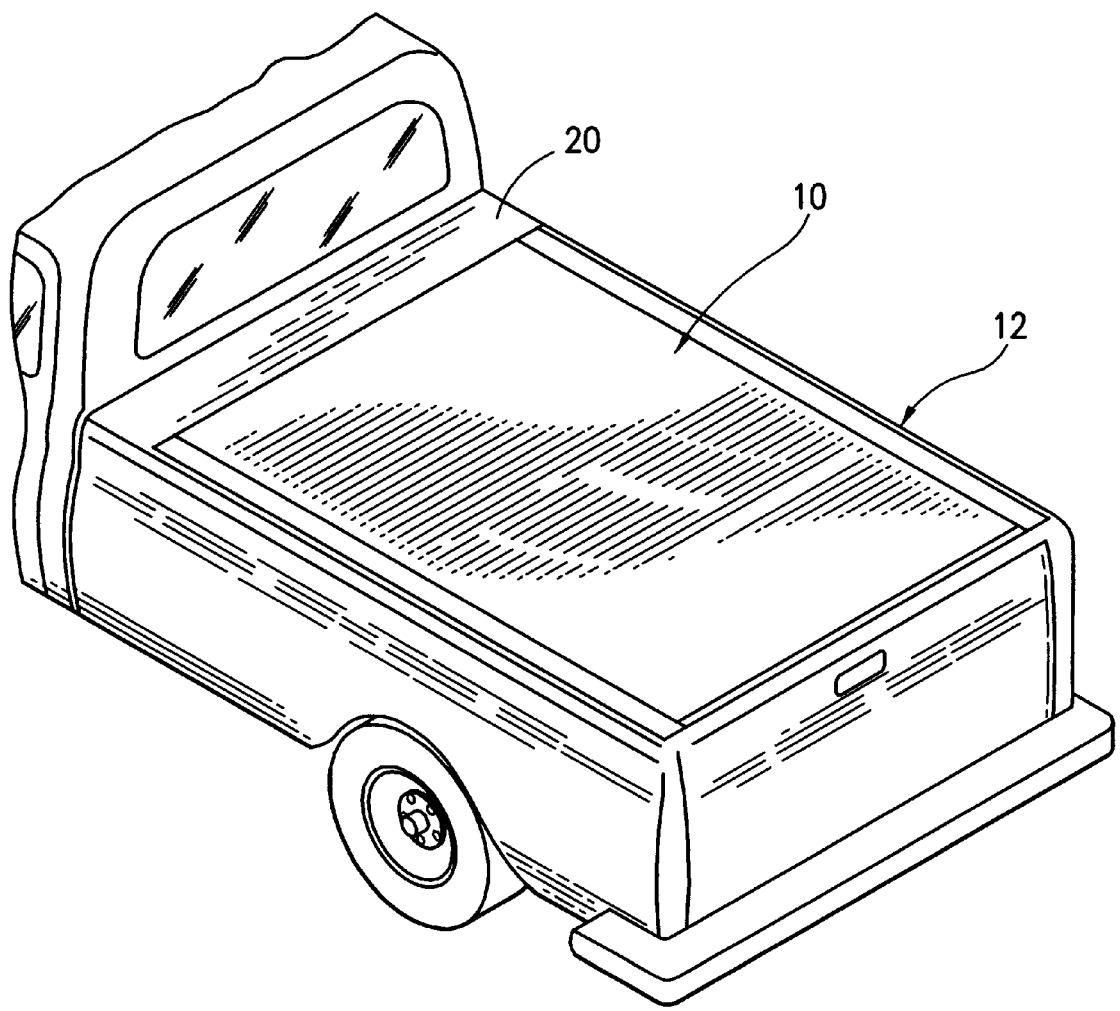
FIG. 1 shows a perspective view of a truck bed cover in accordance with the present invention.

Referring now to the drawings, in particular FIG. 1, the present invention is shown disposed on a conventional pickup truck bed 12 in a closed position. In the front of the truck bed is a storage housing 20 where the truck bed cover can be rolled up about a reel or spindle and stored in the housing 20 so that the truck bed is open.

Figure 2:
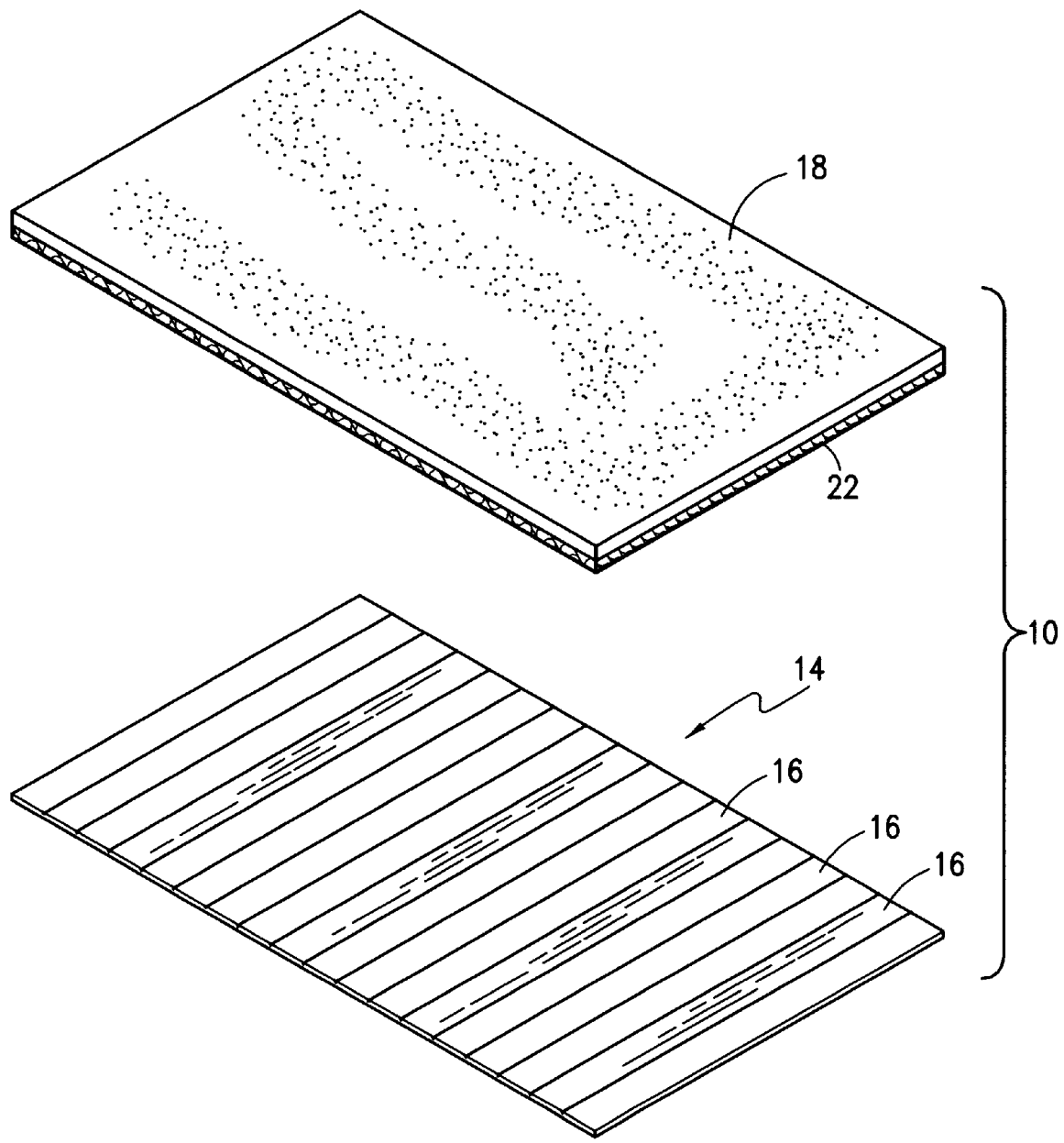
FIG. 2 shows an exploded perspective view of the truck bed cover including slats and pliable material.

Referring now to FIG. 2, the present invention 10 is shown in an exploded view showing an array 14 of elongated slats 16 which are typically extruded aluminum. Each of the slats 16 are attached in a side by side array and are hinged together as described in greater detail below. The cover 10 includes a laminate bonded on top of the slats 16 as a substrate of pliable protective material 18 (vinyl or vinyl-like) that is permanently affixed or laminated to the top of the slats 16 by a high bonding adhesive 22 such as a two sided adhesive tape so that the upper surface of each slat 16 is permanently affixed to the bottom surface of the pliable or resilient material 18. The material 18 and the slats 16 are typically formed in a rectangularly shaped array 14 with the entire truck bed cover 10 being mounted in conventional rails or tracks (see FIG. 1) so that the cover can be retracted into the housing 20 shown in FIG. 1 in a closed or stored position and fully extended covering the truck bed in the operable flat position.

Figure 3:
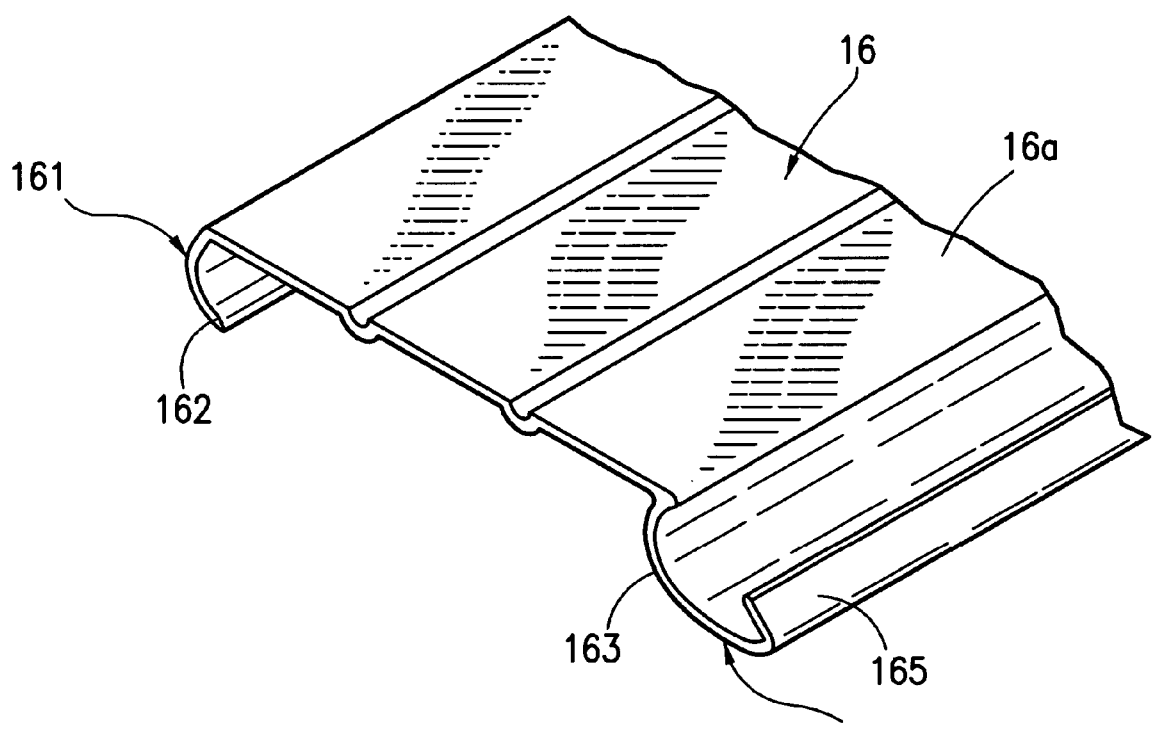
FIG. 3 shows a perspective view partially cut away of a slat made in accordance with the invention.

Referring now to FIG. 3, the slat 16 used in the present invention is shown. Each slat 16 has a leading edge 161 and a trailing edge 164 and are joined in an adjacent relationship with the leading edge of one slat engaged with the trailing edge of an adjacent slat forming a hinge in conjunction with the pliable material connected to both adjacent slats.

The leading edge 161 of the slat 16 protrudes downwardly and has a predetermined radius of curvature on its outer surface and its inner surface terminating in an end flat inner surface 162 that extends a predetermined distance forming the leading edge of the slat body. The radius of curvature of the outer surface is such that it permits a flush engagement inside the trailing edge channel of adjacent slat.

Each slat 16 has a trailing edge 164 that protrudes upwardly and includes not only a curved portion 163 having a predetermined radius of curvature on its outer surface and its inner surface, but terminates in a flange 165 that is substantially flat and disposed at a predetermined angle relative to the slat body 16a.

Figure 4A:
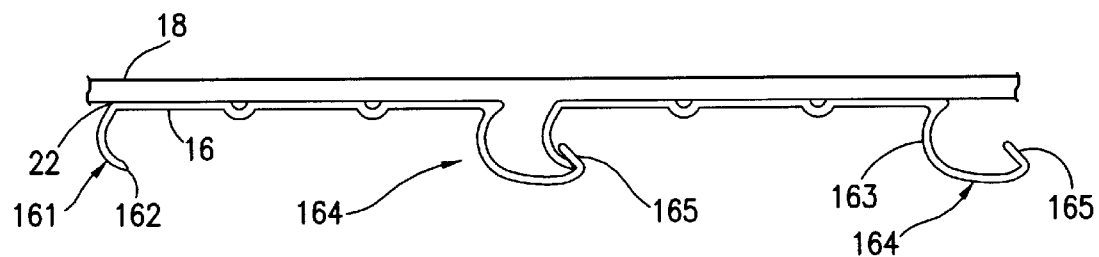
FIG. 4a shows a side elevational view partially cutaway of the present invention in a first flat position which would represent covering a truck bed.

In FIG. 4a, two adjacent slats 16 are shown in the locked position wherein the slats 16 are in the same plane, constituting the covered truck bed position. Note that the inside surface of the flat flange 165 on the trailing edge 164 of one slat engages the inner flat portion 162, of the adjacent slat forming a lock while the pliable material unbonded to the slats maintains a predetermined distance apart. These slats 16 are locked together and with respect to any longitudinal force on the slat bed cover the slats will stay together in a locked position. The flat flange 165 itself is biased upwardly in a 45 degree angle on its inside surface where it engages the leading edge end 162 of the adjacent slat. The leading edge 161 of the adjacent slat is contoured downwardly so that it faces the flange 165 formed by the trailing edge 164. The leading edge 161 could be called the inner hinge between the slats while the trailing edge 164 could be called the outer hinge. The pliable material 18 completes the hinge.

Figure 4B:
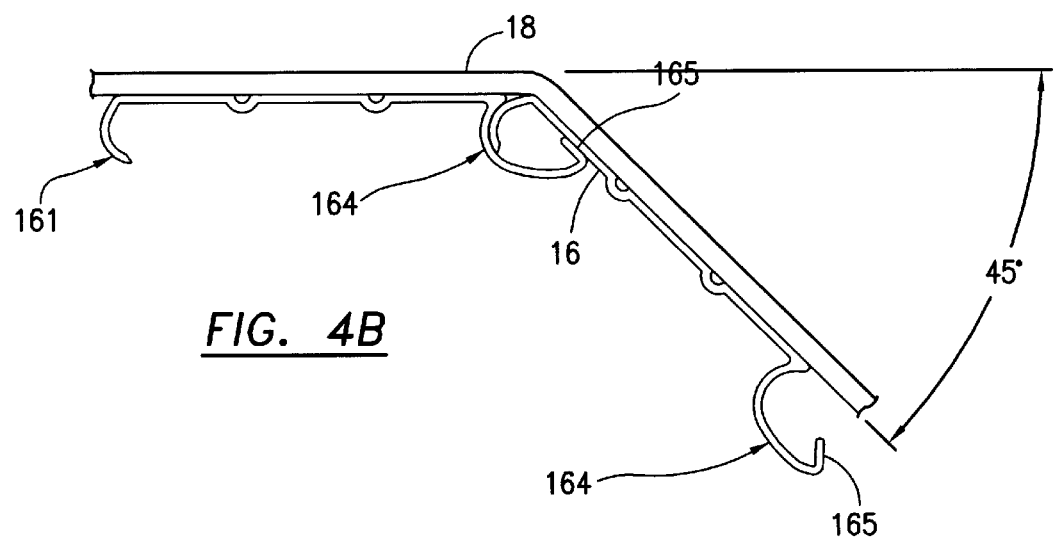
FIG. 4b shows a side elevational view partially cut away of the hinge joint used in the present invention in a rolled up position showing the angular motion permitted with the present hinge joint.

Referring now to FIG. 4*b,* adjacent slats 16 are moved at a 45 degree angle relative to each other. Note the flange 165 on the trailing edge 164 of the hinge remains in the same position while the adjacent slat at the 45 degree angle now engages against its lower surface. The flange 165 forms a positive stop at 45° preventing the two slats from increasing the angle between them. This prevents any stress on the resilient material 18 that also forms part of the hinge as shown. Likewise, the outer surface of the leading edge 161 is curved in such a manner that is flush with a portion of the trailing edge 164 inner surface that is curved. Thus, the hinge joint shown in FIGS. 4*a* and 4*b* provides a positive stop without putting any stress or stretch on the resilient vinyl material 18. Each of the adjacent slats are pivotably movable relative to each other up to a 45° angle which is controlled by the stop that engages the bottom side of an adjacent slat. The resilient hinge is also capable of providing a lock between adjacent slats when the slats are in the same plane. In the flat position between adjacent slats, the leading edge flat has a downwardly positioned flange portion that locks against the inside wall of the upward protruding flange of the trailing edge of the flat. Note that the resilient pliable vinyl material acts as part of the hinge formed between the leading and trailing edges of adjacent slats. Each adjacent slat is glued to a portion of the vinyl material with a space between adjacent slats where there is no glue on the material and where the material curves a 45° angle but is not stressed since there is enough play or movement permitted between the joined leading and trailing edges when the slats are at a 45° angle. Thus, in the flat position the leading and trailing edges are locked together with a sufficient space that is not glued to either of the slats that permits the movement from the flat position to the 45° position without any stress on the vinyl material allowing a natural curve that is not stretched by the slat action at all.

Figure 5A:
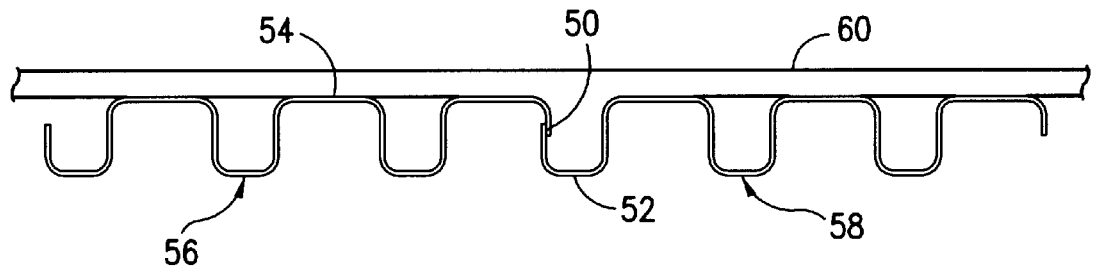
FIGS. 5a and 5b show side elevational views of the prior art showing hinge joints with adjacent slats in flat and angled positions.
Figure 5B:
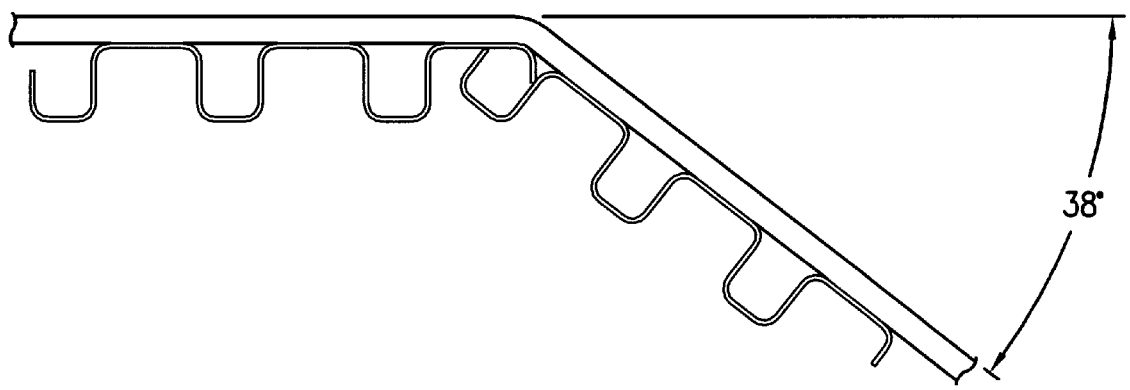

Referring now to FIG. 5*a,* the prior art is shown with a typical existing hinge joint 50 in which basically two 90 degree edges 52 and 54 of adjacent slats 56 and 58 are engaged in a flat position shown in FIG. 5*a.* As shown in FIG. 5*b,* the angle permitted between the two slats 56 and 58 is approximately 38 degrees and the trailing edge of one slat starts to put stress transfer onto the vinyl or resilient material 60 due to the geometry of the 90 degree edges along the leading and trailing edges of the slats.

Utilizing the present invention, a truck bed cover using a vinyl surface that is laminated to a plurality of hinged slats provides a smooth frictionless rotation of the slats without providing any stress on the vinyl material. The present invention also provides a hinge that locks in a fully open position (truck bed being covered flat) eliminating the possibility of slat disengagement while at the same time reducing the retractable roll diameter by increasing slat rotation 18 percent without stress on the resilient material. The cover can also be rolled up in a smaller stored position because of the increased slat rotation to 45 degrees.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A laminated retractable truck bed cover that can be rolled up for storage comprising:

a pliable surface material;

a plurality of elongated substantially flat rigid slats, said slats being engaged in a side by side adjacent relationship forming a slat array and substrate;

an adhesive joining said pliable surface material and laminating it to said array of slats that form a substrate;

each of said slats having a first flat end and a second flat end, a substantially flat top surface and a substantially flat bottom surface, and a leading edge and a trailing edge;

said slat array being formed by a plurality of slats, by joining the leading edge of one slat, to the trailing edge of an adjacent slat forming a hinge in conjunction with the pliable surface material, said adjacent slats being moveable to a first position where the slats are locked together forming a flat 180 degree angle between the adjacent slats and a second position wherein one slat is moved approximately 45 degrees relative to the adjacent slat;

each of said slats having a leading edge with a curved segment of a predefined radius of curvature on its inside surface and its outside surface, said slat trailing edge having a curved segment of a predetermined radius of curvature on its inside surface and its outside surface and a flat flange segment at the end of the curved segment angled to engage the bottom surface of an adjacent slat in approximately a 45 degree angle relative to the adjacent slat forming a positive stop, and the flat flange being biased upwardly relative to the leading edge of an adjacent slat where the leading edge and the trailing edge are locked along the flat flange and the bottom portion of the leading edge, whereby the hinged joint formed prevents stress on the pliable material in either the rolled up position, where the slats are approximately 45 degrees angled to each other, or in a flat position, 180 degrees relative to each other, wherein the distance between said leading edge and said trailing edge flange changes from said first position to said second position.

2. A laminated retractable truck bed cover that can be rolled up for storage comprising:

a pliable surface material;

a plurality of elongated substantially flat rigid slats, said slats being engaged in a side by side adjacent relationship forming a slat array and substrate;

an adhesive joining said pliable surface material and laminating it to said array of slats that form a substrate;

each of said slats having a first flat end and a second flat end, a substantially flat top surface and a substantially flat bottom surface, and a leading edge and a trailing edge;

said slat array being formed by a plurality of slats, by joining the leading edge of one slat, to the trailing edge of an adjacent slat forming a hinge in conjunction with the pliable surface material, said adjacent slats being moveable to a first position where the slats are locked together forming a flat 180 degree angle between the adjacent slats and a second position wherein one slat is moved approximately 45 degrees relative to the adjacent slat; each of said slats having a leading edge with a curved segment of a predefined radius of curvature on its inside surface and its outside surface;

said slat trailing edge having a curved segment of a predetermined radius of curvature on its inside surface and its outside surface and a flat flange segment at the end of the curved segment angled to engage the bottom surface of an adjacent slat in approximately a 45 degree angle relative to the adjacent slat forming a positive stop, and the flat flange being biased upwardly relative to the leading edge of an adjacent slat where the leading edge and the trailing edge are locked along the flat flange and the bottom portion of the leading edge such that the relationship between said leading edge and said adjacent trailing edge of the flat flange changes from an engaged orientation at said first position to a distal orientation at said second position;

whereby the hinged joint formed prevents stress on the pliable material in either the rolled up position, where the slats are approximately 45 degrees angled to each other, or in a flat position, 180 degrees relative to each other; and said pliable material has an area that is not bonded to said slat array in order to permit locking of adjacent slats without stretching said material.

3. The laminated retractable truck bed cover of claim 2 wherein said leading edge and said trailing edge of each said slat does not rise above a horizontal plane defined by said slat array, thereby providing a substantially even horizontal surface in order to allow said pliable material to be placed along said slat array's outer surface.

* * * * *